United States Patent [15] 3,644,275
Betts et al. [45] Feb. 22, 1972

[54] METHOD FOR THE REDUCTION OF PHOTOCHEMICAL DEGRADATION IN POLYURETHANES

[72] Inventors: Albert Thomas Betts, 35, Stonyshotts, Waltham Abbey; Norbert Uri, 27, Chestnut Close, London, N. 14, both of England

[22] Filed: Aug. 21, 1970

[21] Appl. No.: 66,101

Related U.S. Application Data

[63] Continuation-in-part of Ser. No. 652,698, July 12, 1966, Pat. No. 3,546,159.

[30] Foreign Application Priority Data

July 12, 1966  Great Britain ....................... 31,155/66

[52] U.S. Cl. .......................................................... 260/45.7 R
[51] Int. Cl. .......................................................... C08g 51/56
[58] Field of Search .............................. 260/45.7 R, 77.5 SS

[56] References Cited

UNITED STATES PATENTS 3,282,885  11/1966  Schwartz et al. ........................ 260/45.7
3,546,159  12/1970  Betts et al. .............................. 260/45.7

Primary Examiner—Donald E. Czaja
Assistant Examiner—R. A. White
Attorney—Cushman, Darby & Cushman

[57] ABSTRACT

A composition having improved resistance toward photochemical degradation comprises a polyurethane containing at least about 0.01 percent by weight of a dissolved alkali metal fluoride selected from the group consisting of caesium, rubidium, potassium and sodium fluoride.

6 Claims, No Drawings

METHOD FOR THE REDUCTION OF PHOTOCHEMICAL DEGRADATION IN POLYURETHANES

This application is a continuation-in-part of copending application Ser. No. 652,698 filed July 12, 1966, now U.S. Pat No. 3,546,159.

The invention relates to methods of reducing the photochemical degradation of polymeric materials.

It is well known that many organic polymeric materials are degraded photochemically in the atmosphere by exposure to daylight and, to an even greater extent, by exposure to near ultraviolet radiation as found in sunlight. Such degradation may cause embrittlement, discoloration, loss of strength, and other reductions in the desirable properties of the polymeric materials which results in a serious shortening of their serviceable life.

Copending application Ser. No. 652,698 discloses a process for reducing the photochemical degradation of a polymeric material, for example, polyamides polyethers, polycarbonates or polyurethanes which comprises incorporating into the polymeric material at least about 0.01 percent by weight of alkali metal fluoride which is soluble in the polymeric material, whereby the fluoride anions of said alkali metal fluoride combine with heavy metals present in the polymeric material and reduce the ability of said heavy metals to initiate photochemical degradation of said polymeric material. The process is particularly applicable to polyurethanes which are very unstable photochemically and according to the present invention a composition having improved resistance toward photochemical degradation comprises a polyurethane containing at least about 0.01 percent by weight of a dissolved alkali metal fluoride selected from the group consisting of cesium, rubidium, potassium and sodium fluorides.

Of these, sodium fluoride is the least soluble and therefore the least effective of these named alkali metal fluorides. Lithium fluoride is insufficiently soluble for the purpose of the present invention.

The alkali metal fluoride may be incorporated during the manufacture of the polyurethane material or subsequently. However, as polyurethanes are not easily soluble and tend to decompose on heating it is normally preferable to incorporate the soluble alkali metal fluoride in one or more precursors of the polyurethane.

The basis of the invention lies in the discovery that photochemical degradation in a polymeric material such as polyurethane is frequently due to the presence in the material of small concentrations of heavy metals and in particular of iron which can lead to photosensitized formation of free radicals leading to an autoxidation reaction and consequent degradation of the polymeric material. Such a heavy metal catalyzed autoxidation would absorb only a very small proportion of incident light and may well account for the observation that photochemical degradation of certain polymeric materials can take place apparently without significant absorption of incident light and thus seem to contravene the law of photochemical equivalence.

Alkali metal fluorides incorporated in polyurethane materials in accordance with the invention act to inhibit the heavy metal catalyzed autoxidation by forming a stable chelate compound with the heavy metal. The high electron affinity of the fluoride ion leads to a higher energy requirement and therefore lower wavelengths for formation of atoms and free radicals by photoexcited (either primary or secondary) electron transfer involving the chelated heavy metal. The effect of the fluoride is therefore to lower the wavelength of the radiation necessary to excite this type of electron transfer and free radical formation to wavelengths outside the range of the prevalent near ultraviolet radiation of bright daylight or even sunlight and thus to inhibit the photochemical degradation of polymeric materials exposed to radiation within this wavelength range.

The invention is broadly applicable to polyurethane polymers which also contain polyether or polyester units in the polymer chain, i.e., polyether polyurethanes and polyester polyurethanes. The commercial importance of both types has hitherto been limited by their extreme sensitivity to photochemical and thermal degradation and in the instance of polyester polyurethanes also by extreme sensitivity to hydrolytic degradation. However according to the present invention compositions having improved resistance to photochemical degradation may comprise polyether polyurethane or polyester polyurethane containing at least about 0.01 percent by weight of a dissolved alkali metal fluoride selected from the group consisting of cesium, rubidium, potassium and sodium fluoride.

Polymeric materials are normally contaminated by the presence of heavy metals, particularly iron. Moreover, heavy metal compounds are frequently used either as cure catalysts or as additives to polymer mixes. Iron in the form of ferric acetylacetonate is used commercially in the manufacture of polyurethanes, which are as a result of this very unstable photochemically.

To ensure chelating of photochemically active heavy metals such as iron, the weight of fluoride ion introduced into the polyurethane material should preferably be at least five times the weight of these heavy metals. Typically, the proportion of trace iron in commercially available polyurethanes even in the absence of deliberately added iron catalyst may be 1 to 20 parts per million and it is therefore probable that a safe proportion of fluoride is not less than about 0.01 percent by weight of the treated polyurethane material but for practical purposes higher concentration might be preferred.

Thus according to the present invention a composition having improved resistance toward photochemical degradation comprises a polyurethane containing at least 0.0001 percent by weight of iron and at least about 0.01 percent weight of a dissolved alkali metal fluoride selected from the group consisting of cesium, rubidium, potassium and sodium fluoride. Advantageously the ratio of weight of said dissolved alkali metal fluoride to said iron is at least about 5:1.

The addition of soluble alkali metal fluorides to polyurethanes in accordance with the present invention has an important side effect, in that it may prevent, or reduce coloration of the polyurethane attributable to iron. Moreover, we have found that when, in particular cesium fluoride and/or to a lesser extent potassium fluoride is added to polyurethanes there is also an important increase in the thermal stability of the polymer.

Thus according to a further aspect of the present invention a composition having improved resistance toward photochemical and thermal degradation comprises a polyurethane containing more than 0.01 percent by weight of dissolved cesium or potassium fluoride. Where the cure catalyst has been an iron compound, more additive will normally be required to effect an improvement.

The invention will now be illustrated by the following examples in which the degradation by photoinduced autoxidation of polyurethane polymers in which a soluble alkali metal fluoride has been incorporated in accordance with the invention is compared with untreated polyurethane polymers.

EXAMPLE 1

The following ingredients were used to prepare a polyether polyurethane polymer:

Polypropylene glycol (G5001 Shell Chemicals), dried in vacuo (about 1 mm. Hg) at a temperature of 90° C.; isocyanate-terminated polybutylene (Adriprene L100 Trade Mark E 1 DuPont Nemours & Co.), any surface skin having been removed; and toluene di-isocyanate—free of turbity, and having 0.5 percent ferric acetyl acetonate, the cure catalyst introduced immediately prior to use. These ingredients were mixed together in the proportions 74 percent polypropylene glycol: 24 percent Adriprene L100: 2 percent TDI. A polyurethane film of 0.4 mm. thickness was cast after degassing this mixture for 30 mins. at a temperature of 50° C. (1 mm. Hg) to remove trapped air and carbon dioxide, and was subsequently cured at 70° C. for 18 hrs. Further films were cast using Adriprene L100 to which varying concentrations of cesium fluoride, potassium fluoride and sodium fluorides had been added. The films were irradiated with UV light of 365 m$\mu$ wavelengths by means of Hanovia UVS 500 lamps with an intensity of $1.4 \times 10^{-6}$ NH$\nu$/hr.9 cm.$^2$ film area at a temperature of 50° C. The films were visually tested for signs of liquid formation due to degradation and also any softening which could be visually ascertained. The results obtained are shown in table 1.

TABLE 1

Photochemical stability of polyether polyurethanes

| Concentration of fluoride additive in final polymer | Time (days) for noticeable softening | Time (days) for first appearance of liquid |
|---|---|---|
| None | 7 | 10 |
| 0.1% w/w CsF | 8 | 20 |
| 0.5% w/w CsF | 20 | 49 |
| 1.0% w/w CsF | 26 | >52 |
| 0.25% w/w KF | 11 | >34 |
| 0.5% w/w KF | 11 | >34 |

Potassium fluoride was significantly less soluble than cesium fluoride in the polyurethane and sodium fluoride was found to be even less soluble, and consequently of very little value in this particular polymer. The more moderate stabilizing effect of potassium fluoride on polyurethanes subject to UV light is probably due to its solubility limitation which is not significantly above 0.25 percent.

Thermal tests were carried out with polyether polyurethanes prepared as previously described. The films were exposed at a temperature of 100° C. and a visual observation was made for the first sign of the appearance of liquid. The results obtained are shown in Table 2.

TABLE 2

Thermal stability of polyether polyurethanes

| Concentration of fluoride additive in final polymer | Time (days) taken for first appearance of liquid |
|---|---|
| None | 1 |
| 0.1% w/w CsF | 1 |
| 0.5% w/w CsF | 22 |
| 1.0% w/w CsF | 139 |
| 0.25% w/w KF | 2 |
| 0.5% w/w KF | 2 |

Again the very low solubility of sodium fluoride in the polymer resulted in little demonstrable improvements being obtained for this particular polymer with sodium fluoride addition.

EXAMPLE 2

A film of polyether/polyurethane of 0.4 mm. thickness was cast by mixing 130 parts by weight of dried polypropylene glycol (G 5001 Shell Chemicals Ltd.), 30.6 parts of isocyanate terminated polybutylene (Adriprene L100) and 2.5 parts of toluene di-isocyanate the latter containing 0.5 percent ferric acetyl acetonate as a cure catalyst. After mixing, the uncured polyurethane was degassed at 50° C./1 mm. Hg for 30 mm. to remove trapped air and carbon dioxide before casting the film. A similar film was made using Adriprene L100 containing sufficient cesium fluoride to provide 0.22 percent of final composition.

Samples of both films were exposed to light of 365 m$\mu$ wavelength (intensity = $1.25 \times 10^{-4}$ NH$\nu$/hr. in dry air, the test vessel being immersed in a thermostatic bath at 50° C. The film samples were examined at intervals. The film containing no cesium fluoride became softened and could be removed from the vessel only with difficulty after 173 hrs. and had partially liquefied and could not be removed after 244 hrs. The film containing the 0.22 percent cesium fluoride did not become softened until 409 hrs. had elapsed and did not liquefy, even partially, for at least 433 hrs.

Similar tests were carried out with polyester polyurethane polymers and indicated that the addition of soluble alkali metal fluorides may improve the resistance of the polymer to photochemical degradation. However tests are complicated by the great sensitivity of polyester polyurethanes to hydrolytic degradation, rather than oxidative degradation, and in practice it is this hydrolytic instability of polyester polyurethane which determines the useful life of these polymers. Thus the present invention is at this juncture of less importance for polyester polyurethanes than for polyether polyurethanes.

We claim:

1. A composition having improved resistance toward photochemical degradation which comprises a polyurethane containing at least about 0.01 percent by weight of a dissolved alkali metal fluoride selected from the group consisting of cesium, rubidium, potassium and sodium fluorides.

2. A composition according to claim 1 wherein said polyurethane is a polyether polyurethane.

3. A composition according to claim 1 wherein said polyurethane is a polyester polyurethane.

4. A composition having improved resistance toward photochemical degradation which comprises a polyurethane containing at least 0.0001 percent by weight of iron and at least about 0.01 percent by weight of a dissolved alkali metal fluoride selected from the group consisting of cesium, rubidium, potassium and sodium fluorides.

5. A composition according to claim 4 wherein the ratio by weight of said dissolved alkali metal fluoride to said iron is at least about 5:1.

6. A composition having improved resistance toward photochemical and thermal degradation which comprises a polyurethane containing more than 0.01 percent by weight of dissolved alkali metal fluoride selected from the group consisting of cesium fluoride and potassium fluoride.

* * * * *